US011752844B2

(12) United States Patent
Bell

(10) Patent No.: US 11,752,844 B2
(45) Date of Patent: Sep. 12, 2023

(54) REPLACEMENT JEEP® DOOR FRAME AND FABRIC COVER

(71) Applicant: James Bell, Rockport, ME (US)

(72) Inventor: James Bell, Rockport, ME (US)

( * ) Notice: Subject to any disclaimer, the term of this patent is extended or adjusted under 35 U.S.C. 154(b) by 0 days.

(21) Appl. No.: 17/803,364

(22) Filed: May 27, 2022

(65) Prior Publication Data

US 2022/0379693 A1 Dec. 1, 2022

Related U.S. Application Data

(63) Continuation-in-part of application No. 17/300,359, filed on May 25, 2021, now Pat. No. 11,446,991.

(51) Int. Cl.
*B60J 5/04* (2006.01)

(52) U.S. Cl.
CPC .............. *B60J 5/0487* (2013.01); *B60J 5/048* (2013.01)

(58) Field of Classification Search
CPC ......... B60J 5/0487; B60J 5/0486; B60J 5/048
See application file for complete search history.

(56) References Cited

U.S. PATENT DOCUMENTS

| 2,460,399 | A | | 2/1949 | Schassberger |
| 2,620,224 | A | | 12/1952 | Hedley |
| 2,682,427 | A | | 6/1954 | Bright |
| 3,055,700 | A | | 9/1962 | Glas |
| 4,070,056 | A | | 1/1978 | Hickman |
| 4,220,298 | A | | 9/1980 | Willis |
| 4,644,699 | A | | 2/1987 | Chandler |
| 5,362,119 | A | * | 11/1994 | Rosentratter .......... B60J 1/2063 |
| | | | | 160/DIG. 3 |
| 5,921,609 | A | * | 7/1999 | Mills ..................... B60J 5/0487 |
| | | | | 160/370.21 |
| 6,773,054 | B2 | | 10/2004 | Martini |
| 7,275,670 | B1 | | 10/2007 | Shumack |
| 7,293,681 | B2 | | 11/2007 | Wills |
| 7,686,379 | B2 | | 3/2010 | Lemieux |
| 8,794,692 | B1 | | 8/2014 | Burk |
| 9,156,336 | B2 | * | 10/2015 | Fennell ..................... B60J 5/08 |
| 9,387,747 | B2 | | 7/2016 | Wang |
| 9,527,371 | B2 | | 12/2016 | Flores |
| 10,106,019 | B2 | * | 10/2018 | Rafeld ................... B60J 5/0476 |
| 11,446,990 | B2 | * | 9/2022 | Bell ......................... B60J 5/067 |
| 11,446,991 | B2 | * | 9/2022 | Bell ....................... B60J 5/0468 |
| 2002/0093224 | A1 | | 7/2002 | Richardson |
| 2022/0041040 | A1 | * | 2/2022 | Clancy .................. B60J 5/0481 |

* cited by examiner

*Primary Examiner* — Jason S Morrow

(74) *Attorney, Agent, or Firm* — Randal Homburg

(57) ABSTRACT

A collapsible door frame with an extendable upper and lower fabric cover replaces a factory door for a JEEP® or other sport utility vehicle, providing the vehicle for operation with an open door frame with the application of the collapsible door frame and extension of an upper clear and lower fabric covering from a cross-frame member, the upper and lower covering attaching to the collapsible door frame to provide protection from adverse weather conditions.

4 Claims, 6 Drawing Sheets

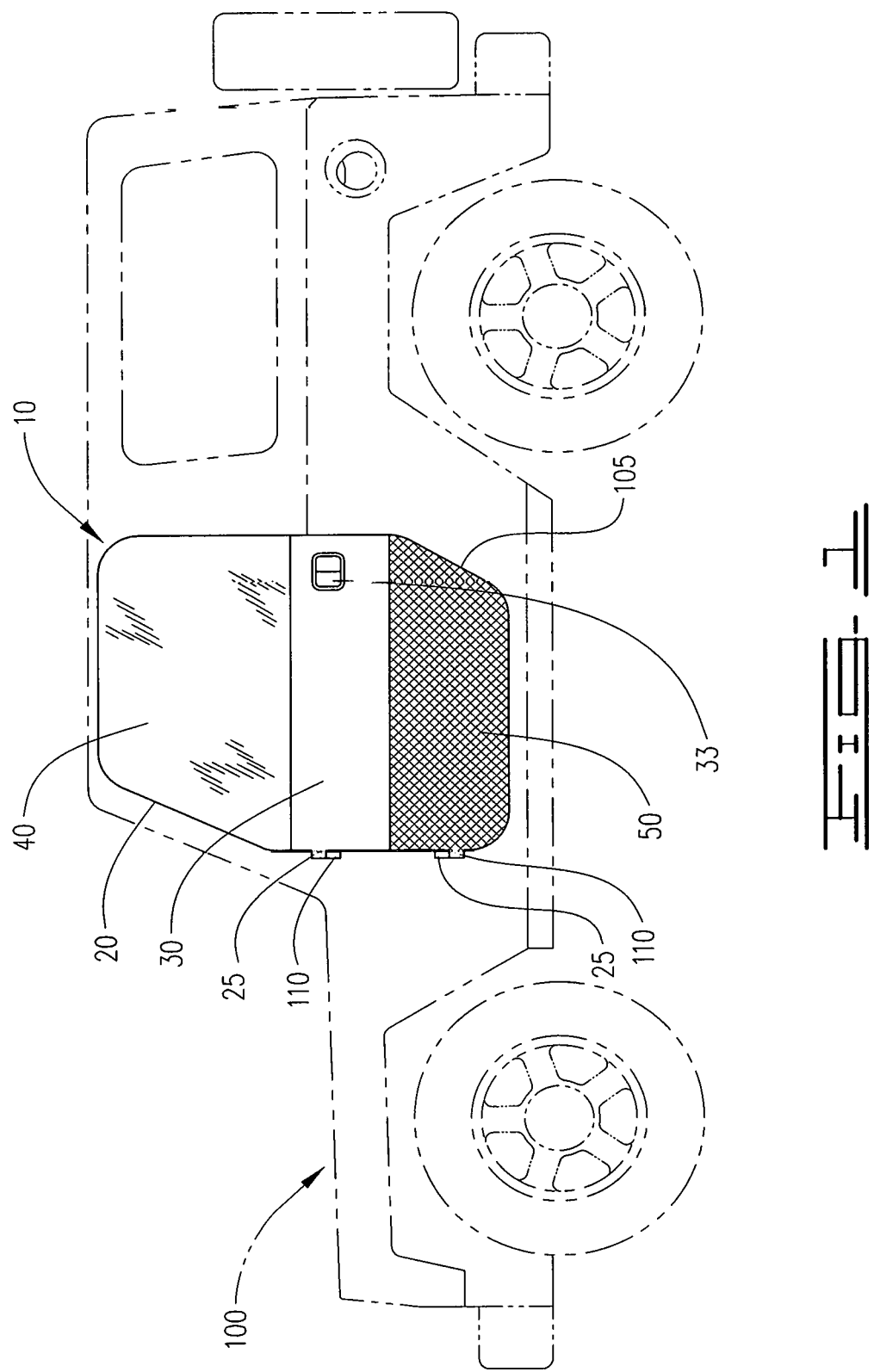

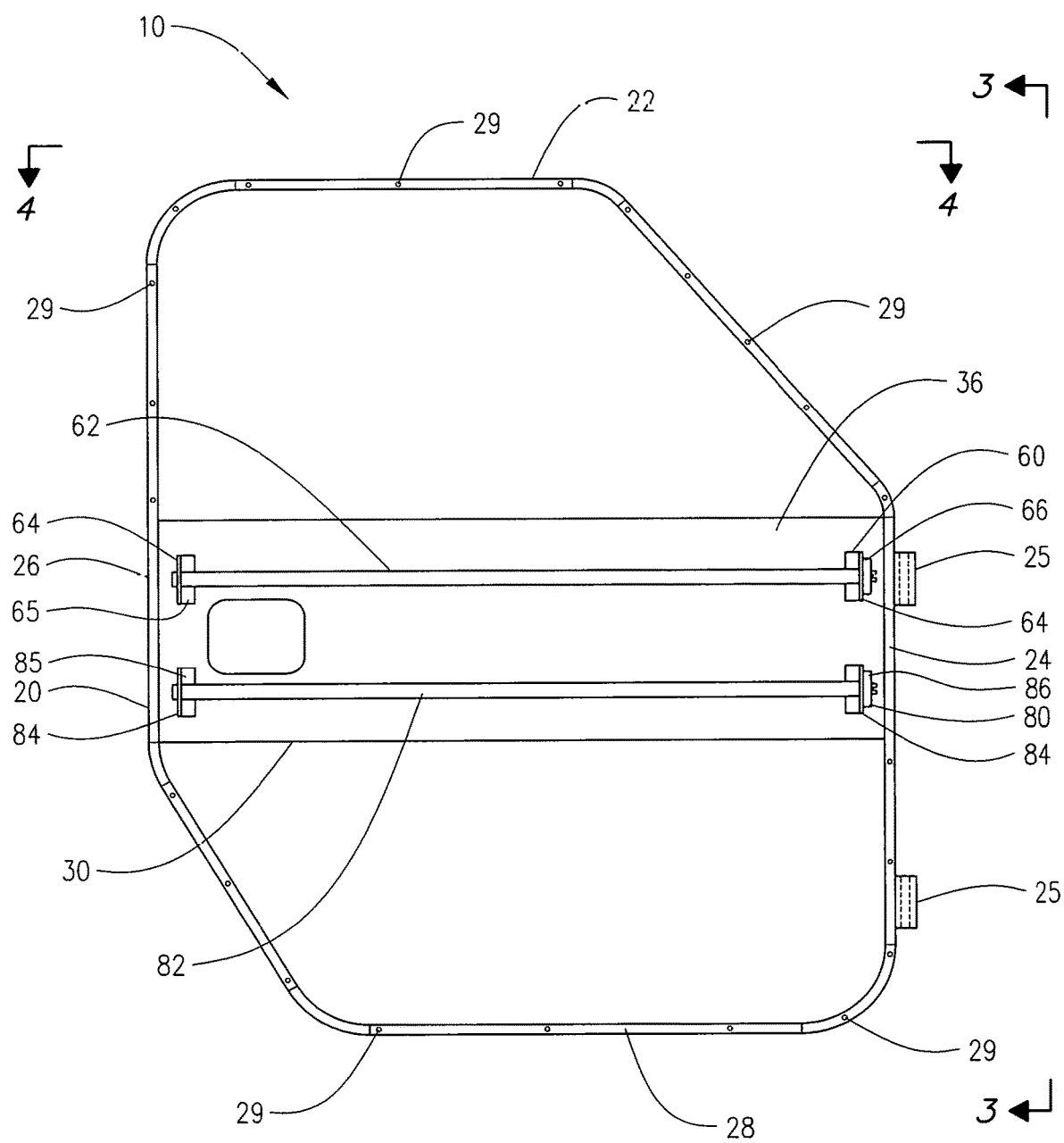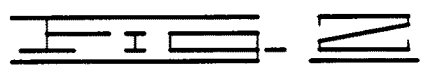

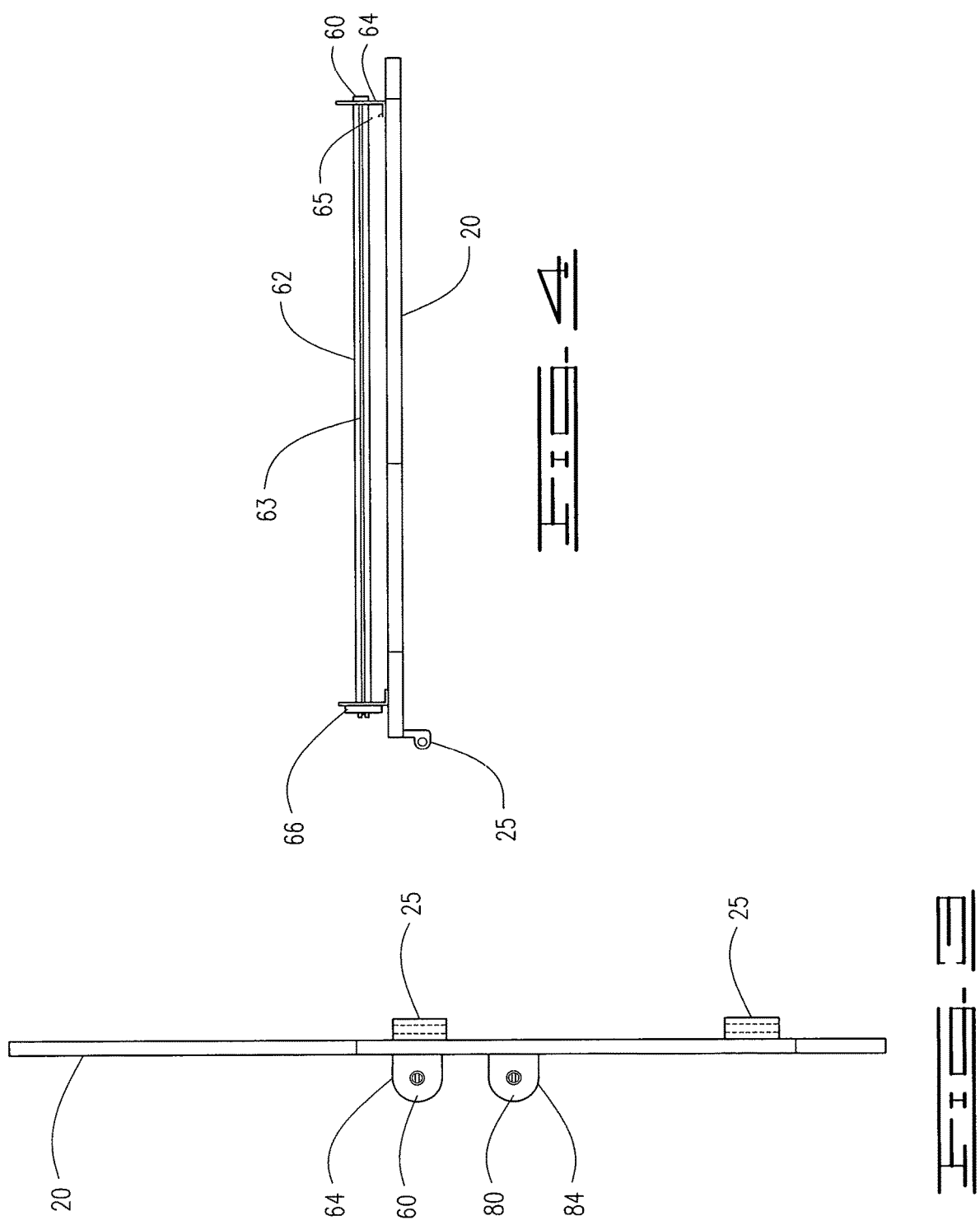

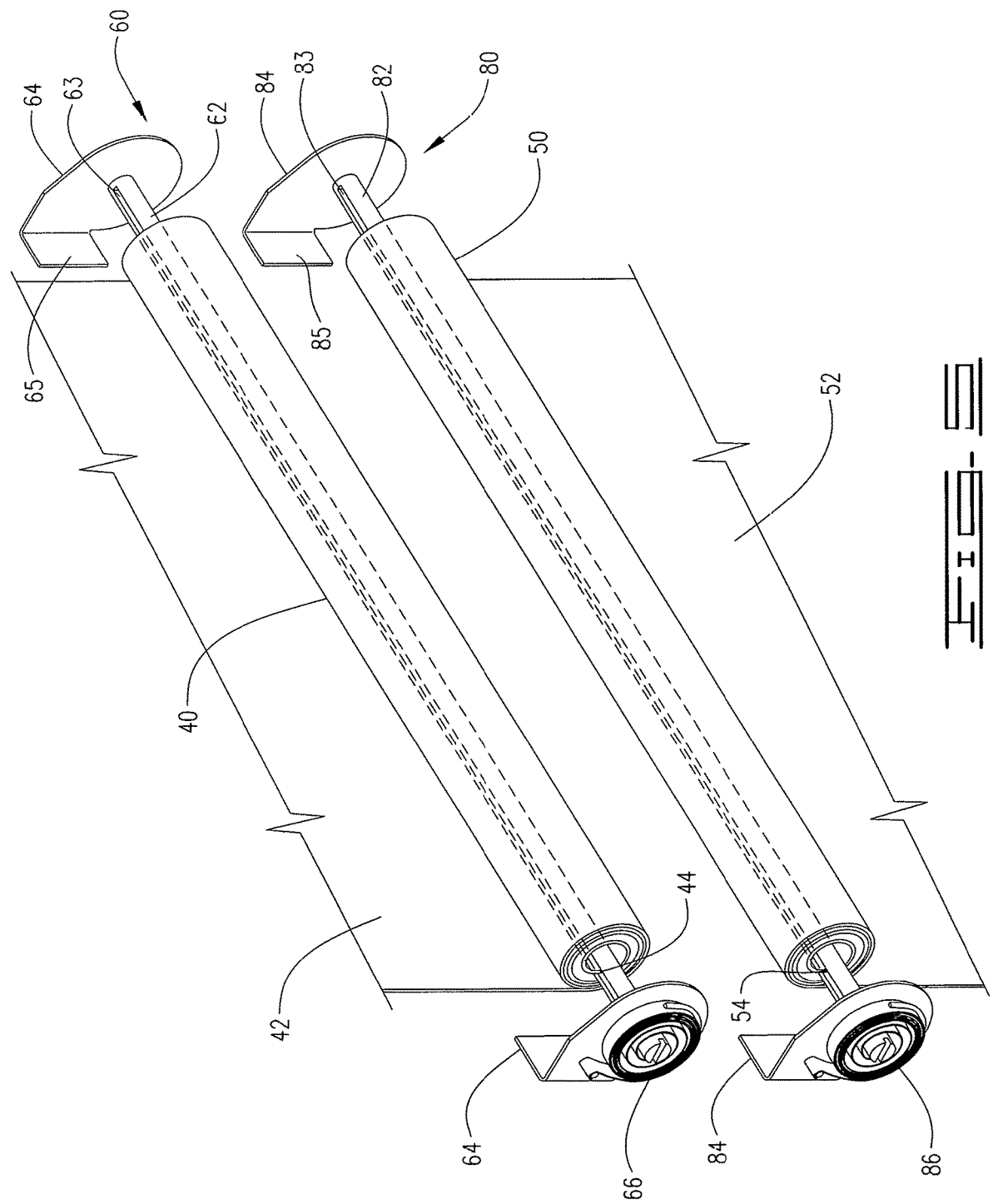

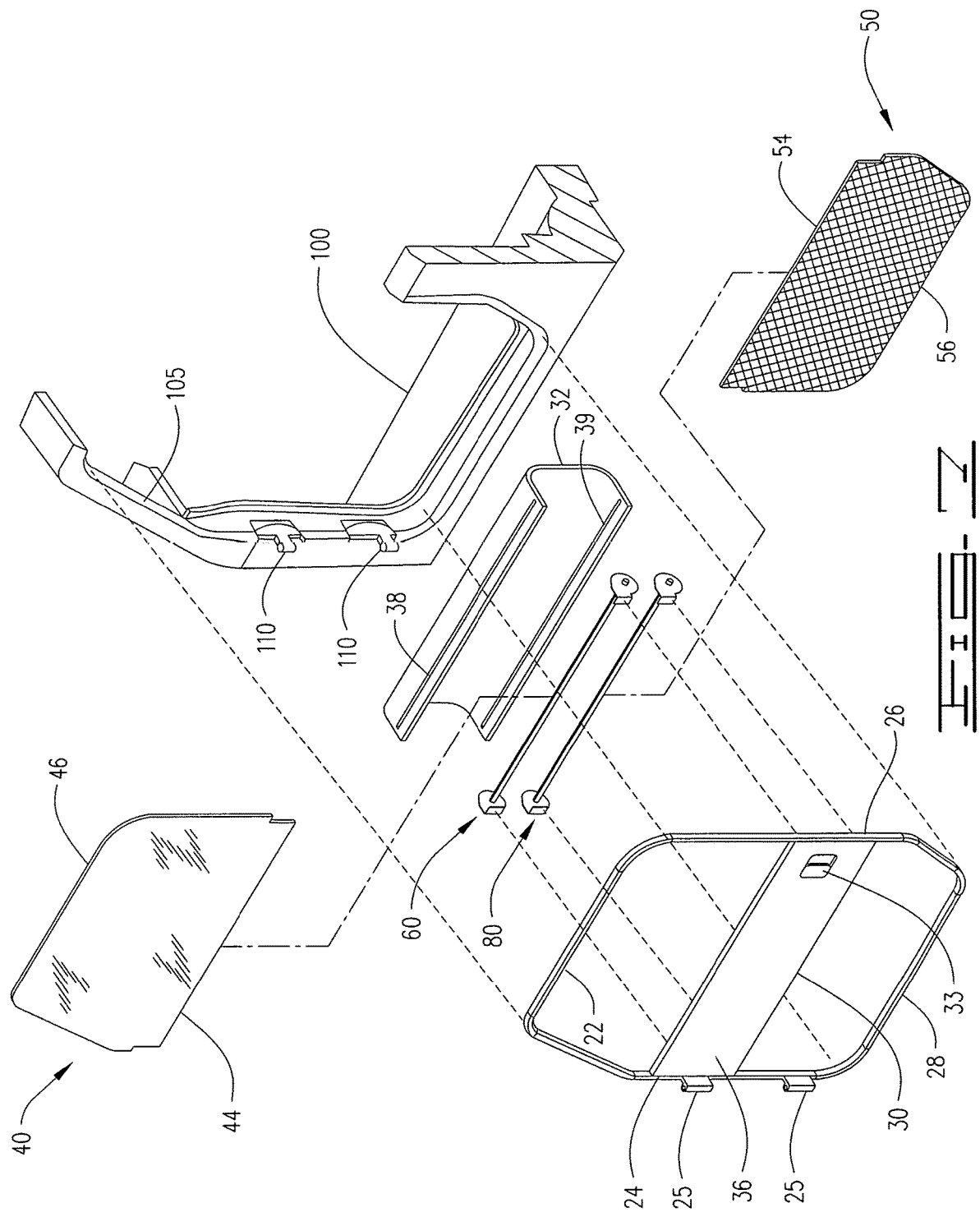

REPLACEMENT JEEP® DOOR FRAME AND FABRIC COVER

CROSS REFERENCE TO RELATED APPLICATIONS

This is a continuation-in-part application of U.S. patent application Ser. No. 17/300,359, filed by the same inventor on May 25, 2021.

I. BACKGROUND OF THE INVENTION

1. Field of Invention

A collapsible door frame with an extendable upper and lower fabric cover replaces a factory door for a JEEP® or other sport utility vehicle, providing the vehicle for operation with the application of the collapsible door frame and extension of the upper clear and lower fabric coverings from a cross-frame member applied to the door frame, the upper and lower coverings attaching to the collapsible door frame to provide protection from adverse weather conditions.

2. Description of Prior Art

A preliminary review of prior art patents was conducted by the applicant which reveal prior art patents in a similar field or having similar use. However, the prior art inventions do not disclose the same or similar elements as the present utility vehicle accessory door, nor do they present the material components in a manner contemplated or anticipated in the prior art.

This is evident in certain prior art wherein the factory hard panel doors are replaced by alternative door panels (U.S. Pat. No. 7,686,379 to Lemieux, U.S. Pat. No. 6,773,054 to Martini, U.S. Pat. No. 4,644,699 to Chandler, U.S. Pat. No. 4,220,298 to Willis, and U.S. Pat. No. 4,070,056 to Hickman), and recreational vehicles which provide for on-board storage systems for the door panels, as seen in U.S. Pat. No. 7,293,681 to Willis and A door flap is suspended from an upper roll bar support/cage, providing a "gull wing" which defines a frame, one or more panels, a latch and a lift-assist device such as a gas-strut, in U.S. Pat. No. 8,794,692 to Burke. A removable door skin for a vehicle mounting on a door frame member includes a flexible door panel that includes an edge and a flap, as well as a fastening means which provides a first part on the flexible door panel and a second part on the flap, shown as a hook and loop fastening material, as demonstrated in U.S. Pat. No. 7,686,379 to Lemieux.

An open mesh door panel comprising a rigid frame member has an open mesh panel over the frame member in U.S. Pat. No. 6,773,054 to Martini, while a transparent door panel is shown in U.S. Pat. No. 4,644,699 to Chandler, using space age plastic clear panels having high impact capacity for earth moving machines, providing full side vision. A fabric covered door frame over a resilient skeletal framework is shown in U.S. Pat. No. 4,070,056 to Hickman, the framework being bent to conform to the door opening. Other frame and fabric door panels are shown in earlier patent, U.S. Pat. No. 3,055,700 to Glas, U.S. Pat. No. 2,682,427 to Bright, and 2,620,224 to Hedley.

None of the above prior art patents demonstrate a replacement door for a sport utility vehicle comprising a door frame installed within the hinges of the vehicle door opening with a fabric cover which is recoiled and deployed upon a first cylindrical, spring-loaded rod integrated within a cross-panel member attached across the collapsible door frame, and a separate second cylindrical, spring loaded rod integrated within the same cross-panel member extending an upper transparent panel attached thereto, with the fabric cover the transparent panel independently attaching to the door frame, as defined within the scope of the present collapsible door frame, cross-panel member and dual independent cylinders.

II. SUMMARY OF THE INVENTION

Owners of sport utility vehicles, primarily Jeeps, often choose to remove the doors from the vehicles for off road activities, by removing the doors from the hinges and either leaving them behind at a storage location or storing them within the vehicle. This open door provision is common, and requires the disengagement of a rod which connects the respective doors to the vehicle door frame openings, either by independent hinge pins or a common hinge pin which extends through an upper and lower hinge mount and the upper and lower door hinge.

The present collapsible door frame with an extendable fabric panel and separate extendable transparent panel independently attached by respective retractable cylinder members within a common cross-panel member, provides the collapsible door frame which defines a door frame of the same size and configuration as the factory supplied doors and attaches in the same manner as the factory supplied doors, which integrates with the upper and lower hinge mounts and the upper and lower door hinges defined within the collapsible door frame, further providing a cross-panel member having a lower retractable cylinder extending a lower pull-out door panel that extends and anchors across the collapsible door frame by a plurality of connecting means and an upper pull-out window panel which extends from a respective retractable cylinder, further connecting to the door frame to provide protection against adverse outdoor elements while being operated by the user until such time as the user decides to remove the collapsible door frame and return the fabric panel and window panel to a retracted state and return the entire assembly to storage.

III. DESCRIPTION OF THE DRAWINGS

The following drawings are submitted with this utility patent application.

FIG. 1 is a side view of a recreational vehicle with the replacement door assembly installed on the driver side of the vehicle with the upper panel and lower panel extended and attached to the light-weight door frame.

FIG. 2 is an inside view of the replacement door frame assembly with the inside frame panel removed to expose the upper retractable fabric coil and lower retractable fabric coil as installed on the outside frame panel.

FIG. 3 is a sectional view along section lines 3/3 of FIG. 2.

FIG. 4 is a sectional view along reference lines 4/4 of FIG. 2.

Figures 5A, 5B:
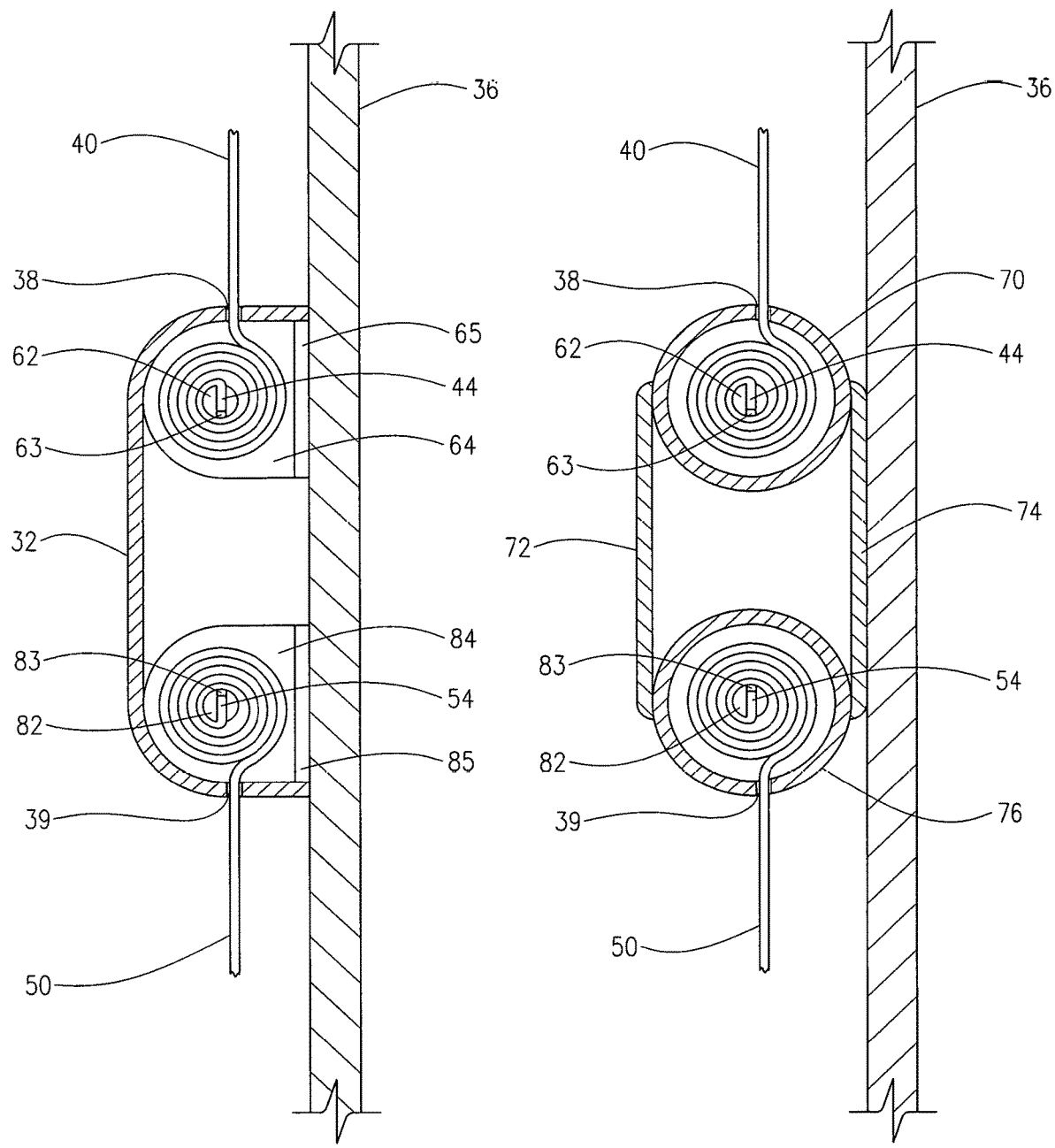
FIG. 5 is an isolation perspective view of the upper and lower fabric coils partially extending respective upper and lower fabric panels.

FIG. 6A is a cross sectional view of a first embodiment of the upper and lower retractable fabric coils and respective upper and lower fabric panels in a partially extended manner as attached to the outside frame panel of the cross-member with the inside frame panel extending over the upper and lower fabric coils with respective upper and lower panel slots in the inside frame panel allowing passage of the respective upper and lower fabric panels shown extending through each respective panel slot.

FIG. 6B is a second embodiment of the upper and lower fabric coils and respective upper and lower fabric panels in a partially extended manner as encased within a respective upper and lower cylindrical coil tube, with the upper and lower coil tubes independently attaching both the inside frame panel and the outside frame panel in a vertical orientation, suspending each respective cylindrical coil tubes between the inside and outside frame panels of the cross-member to form the overall cross-member.

FIG. 7 is an exploded view of the door frame attaching the outside frame panel, the upper and lower retractable fabric coils, the inside frame panel of the first embodiment, the upper fabric panel and the lower fabric panel, along with the door frame opening of the recreational vehicle.

IV. DESCRIPTION OF THE PREFERRED EMBODIMENT

A collapsible replacement door assembly 10 for a recreational vehicle 100 provides a light-weight door frame 20, FIGS. 1-7, replacing a factory door and adapted to fit into the door frame opening 105 of the recreational vehicle and attached to the hinge brackets 110 mounted to the recreational vehicle 100 by the same hinge pins to open and close the replacement door assembly 10 in the same manner as the factory door being replaced. The replacement door assembly 10 has the door frame 20 defining an upper frame member 22, a front side member 24 defining hinge mounts 25 to connect to the hinge brackets 110 of the door frame opening 105 and allow the replacement door assembly 10 to open and close within the door frame opening 105, a rear side member 26 and a lower frame member 28, with each member having a capacity to be disassembled from adjacent members for compact storage. One or more attaching members 29 are provided around the door frame. The door frame 20 may have more components, but requires at least those sections indicated for purposes of the embodiment being disclosed and referenced herein.

A cross frame member 30 attaches to the door frame 20 bisecting the door frame 20. The embodiments being shown and referenced in the specification and FIGS. 1-7, have the cross frame member 30 attached between the front side member 24 and the rear side member 26, but it should be anticipated that any bisection, whether it is horizontal, vertical or diagonal, is contemplated within the scope of this invention.

The cross frame member 30 provides an inside frame panel 32 and outside frame panel 36 which respectively retain and suspend an upper retractable fabric coil 60 and a lower retractable fabric coil 80, each fabric coil being spring loaded to urge the coil into a retracted position, FIGS. 6A and 6B. Each coil 60, 80 has a respective upper fabric panel 40 or lower fabric panel 50 which is retractably wound around each respective retractable fabric coil 60, 80 and extending from the respective retractable fabric coil 60, 80 to deploy and unfurl each respective fabric panel 40, 50, FIGS. 5-7, to be independently attached to the door frame 20.

The lower fabric panel 50 extending from the lower retractable fabric coil 80 is a durable patterned non-tear fabric panel and an upper fabric panel 40 extending from the upper retractable fabric coil 80 is a transparent non-tear panel, allowing the operator of the vehicle to be able to see through the upper fabric panel 40 when extended and attached to the door frame 20, FIGS. 1 and 7. Also, each fabric panel 40, 50, includes a respective inner surface 42, 52, having one or more attaching means which independently connect each fabric panel to the attaching members 29 of the door frame 20, the upper fabric panel 40 attaching to the upper frame member 22 and the lower fabric panel 50 attaching to the lower frame member 28. The fabric panel attaching means are not shown in the drawing figures. The attaching members 29 and attaching means may include snap caps and bases, hook and loop fabric, hooks and clasps, or a mating zipper.

Each upper and lower retractable coil 60, 80 includes a central shaft 62, 82 defining a linear groove 63, 83 inserting a coil end 44, 54 of each fabric panel, 40, 50 and around which each respective fabric panel 40, 50 is coiled, FIGS. 4-6b. End caps 64, 84 attached to each end of the respective central shaft 62, 82, a flange mount 65, 85 defined on each end cap 64, 84 which are attached to either the inside frame member 32 or outside frame member, FIGS. 2-6A, and a retraction means 66, 86, shown in FIG. 5 as a spring coil included in at least one of the end caps 64, 84 urging the respective central shaft 62, 82 to rotate, causing the respective fabric panel 40, 50 to recoil around the respective central shaft 62, 82.

The cross frame member 30 can be permanently attached to the door frame 20 or removably attached to the door frame 20 if a fully collapsible and stored embodiment is utilized over a permanently assembled door frame 20 and cross member 30, both contemplated within the scope of this disclosed replacement door panel assembly. This connection may be made by a contoured end on a front or rear portion of the cross member 30 inside or outside frame panel 36 which fits around a portion of the door frame 20, a screw securing the inside or outside panel to a location on the door frame or other securing means which would allow for installation and removal of the cross frame member 30, not shown. In other embodiments not shown or claimed, wherein the cross frame member is other than horizontal as shown in the drawings, each fabric panel may include portions that are transparent and non-transparent to enable the drive to safely view traffic while operating the vehicle in the same manner as the factory door panel being replaced.

The door handle assembly 33 integrating within the cross frame member 30 would be included between the outside frame panel 36 when the replacement door assembly 10 is installed to open and close enabling the replacement door assembly 10, FIGS. 1 and 7, with the door handle assembly 33 directed towards the rear side member to engage a vehicle door latch within the door frame opening 105 of the recreational vehicle 100 in an identical manner as the factory door, not shown. There should be at least an inside and/or outside door handle, a latch member and a handle rod attached to the door latch to release or activate the door latch, also not shown since this is common door handle assembly provided in vehicle doors. Each hinge mount 25 attached to the front side panel is aligned with the hinge brackets 110 of the door frame opening 105, further connected by the factor hinge pin, FIGS. 1 and 7.

Two cross-member embodiments are demonstrated in FIGS. 6A and 6B. In a first embodiment, FIGS. 2, 6A and 7, the cross member defines the outside frame panel 36, the upper and lower retractable fabric coils 60, 80 attaching to the outside frame panel 36 in a vertical orientation and the inside frame panel 32 attached around the upper and lower retractable fabric coils 60, 80, with an upper panel slot 38 providing passage to the upper fabric panel 40 to be elevated from the inside frame panel 32 and a lower panel slot 39 providing passage to the lower fabric panel 50 to be lowered from the inside frame panel 32, further providing each panel to be attached to the door frame, FIG. 1. The second embodiment, FIG. 6B, defines an outer mounting plate 74 attached to the outside frame panel 36 with the outer mounting plate 74 attaching an upper support tube 70 and a lower support tube 76, further attaching an inner mounting plate 72, with each respective upper and lower support tube 70, 76 containing the respective upper and lower retractable fabric coil 60, 80 upon which the respective fabric panel 40, 50 is retractably wound, with each respective upper and lower support tube 70, 76 having a respective fabric panel slot 38, 39 defined to provide extension of each respective upper and lower fabric panel 40, 50 frame each respective upper and lower support tube, 72, 74. In both embodiments, there can be a defined expansion of each fabric panel at a respective distal end portion 46, 56 opposite the coil ends 44, 54 to prevent the fabric panel from being completely withdrawn inside either the inside frame panel or the support tube, not shown.

While the replacement door assembly 10 has been particularly shown and described with reference to a preferred embodiment thereof, it will be understood by those skilled in the art that changes in form and detail may be made therein without departing from the spirit and scope of the invention.

What is claimed is:

1. A replacement door assembly for a recreational vehicle replacing a factory door and adapted to fit into the door frame opening, said replacement door assembly comprising:
    a collapsible door frame defining an upper frame member, a front frame member extending at least two hinge mounts integrating with at least two hinge brackets defined within said door frame opening of said recreational vehicle, a rear side member and a lower frame member conforming in shape to said door frame opening when assembled, said door frame further defining a plurality of attaching members;
    a cross frame member bisecting said door frame member, said cross frame member defining an outside frame member, an inside frame member and a door a door handle assembly to open and securely close said replacement door assembly within said door frame opening of said recreational vehicle;
    an upper retractable fabric coil retractably receiving and extending an upper fabric panel having a coil end secured to a central shaft of said upper retractable fabric coil suspended between a pair of end caps defining respective flange mounts secured to said outside frame member;
    a lower retractable fabric coil retractably receiving and extending a lower fabric panel having a coil end secured to a central shaft of said lower retractable fabric coil suspended between a pair of end caps defining respective flange mounts secured to said outside frame member below said upper retractable fabric coil, wherein said upper fabric panel is transparent providing an ability to see through said upper fabric panel and said lower fabric panel is a durable fabric, each said fabric panel connecting to said attaching members of said door frame for full deployment during use.

2. The replacement door assembly of claim 1, further defining:
    said upper and lower retractable fabric coils further define a respective retraction means independently urging said respective central shaft in a direction to retract each said respective upper and lower fabric panel upon said respective central shaft; and
    each respective coil end of said upper and lower fabric panel is installed within a respective linear groove in each said central shaft providing for a replacement upper or lower panel to be installed to replace a worn upper or lower fabric panel.

3. The replacement door assembly of claim 1, said cross frame member further comprising:
    an outer mounting plate attached to said outside frame member, said outer mounting plate further attaching an upper support tube and a lower support tube which are also attached to an inner mounting plate, with said upper support tube containing said upper retractable fabric coil with said upper fabric panel and said lower support tube containing said lower retractable fabric coil with said lower fabric panel, said upper support tube defining an upper panel slot through which said upper fabric panel is extended and said lower support tube defining a lower panel slot through which said lower fabric panel is extended, and;
    said upper and lower retractable fabric coils further define a respective retraction means independently urging said respective central shaft in a direction to retract each said respective upper and lower fabric panel upon said respective central shaft.

4. The replacement door assembly of claim 1, said inside frame member further defining:
    an upper panel slot providing passage for said upper fabric panel to be extended;
    a lower panel slot providing passage for said lower fabric panel to be extended; and
    said upper and lower retractable fabric coils further define a respective retraction means independently urging said respective central shaft in a direction to retract each said respective upper and lower fabric panel upon said respective central shaft.

* * * * *